(12) United States Patent
Bojja et al.

(10) Patent No.: US 9,372,848 B2
(45) Date of Patent: Jun. 21, 2016

(54) SYSTEMS AND METHODS FOR LANGUAGE DETECTION

(71) Applicant: Machine Zone, Inc., Palo Alto, CA (US)

(72) Inventors: Nikhil Bojja, Mountain View, CA (US); Pidong Wang, Singapore (SG); Fredrik Linder, Castro Valley, CA (US); Bartlomiej Puzon, Burlingame, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

(21) Appl. No.: 14/517,183

(22) Filed: Oct. 17, 2014

(65) Prior Publication Data

US 2016/0110340 A1    Apr. 21, 2016

(51) Int. Cl.
*G06F 17/27* (2006.01)
*G06F 17/28* (2006.01)

(52) U.S. Cl.
CPC .................... *G06F 17/275* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ....................................................... 704/1–10
See application file for complete search history.

(56) References Cited

U.S. PATENT DOCUMENTS

| | | | |
|---|---|---|---|
| 4,460,973 | A | 7/1984 | Tanimoto et al. |
| 4,502,128 | A | 2/1985 | Okajima et al. |
| 4,706,212 | A | 11/1987 | Toma |
| 5,313,534 | A | 5/1994 | Burel |
| 5,526,259 | A | 6/1996 | Kaji |
| 5,884,246 | A | 3/1999 | Boucher et al. |
| 5,991,710 | A | 11/1999 | Papineni et al. |
| 6,125,362 | A * | 9/2000 | Elworthy |
| 6,182,029 | B1 | 1/2001 | Friedman |

(Continued)

OTHER PUBLICATIONS

"Arabic script in Unicode," downloaded Dec. 22, 2014, from <http://en.wikipedia.org/wiki/Arabic_script_in_Unicode>, 18 pages.

(Continued)

*Primary Examiner* — Lamont Spooner
(74) *Attorney, Agent, or Firm* — Goodwin Procter LLP

(57) ABSTRACT

Implementations of the present disclosure are directed to a method, a system, and a computer program storage device for detecting a language in a text message. A plurality of different language detection tests are performed on a message associated with a user. Each language detection test determines a set of scores representing a likelihood that the message is in one of a plurality of different languages. One or more combinations of the score sets are provided as input to one or more distinct classifiers. Output from each of the classifiers includes a respective indication that the message is in one of the different languages. The language in the message may be identified as being the indicated language from one of the classifiers, based on a confidence score and/or an identified linguistic domain.

30 Claims, 13 Drawing Sheets

(56) References Cited

U.S. PATENT DOCUMENTS

| | | |
|---|---|---|
| 6,269,189 B1 | 7/2001 | Chanod |
| 6,285,978 B1 | 9/2001 | Bernth et al. |
| 6,304,841 B1 | 10/2001 | Berger et al. |
| 6,722,989 B1 | 4/2004 | Hayashi |
| 6,799,303 B2 | 9/2004 | Blumberg |
| 6,801,190 B1 | 10/2004 | Robinson et al. |
| 6,848,080 B1 | 1/2005 | Lee et al. |
| 6,993,473 B2 | 1/2006 | Cartus |
| 6,996,520 B2 | 2/2006 | Levin |
| 7,165,019 B1 | 1/2007 | Lee et al. |
| 7,174,289 B2 | 2/2007 | Sukehiro |
| 7,451,188 B2 | 11/2008 | Cheung et al. |
| 7,478,033 B2 | 1/2009 | Wu et al. |
| 7,533,013 B2 | 5/2009 | Marcu |
| 7,539,619 B1 | 5/2009 | Seligman et al. |
| 7,895,576 B2 * | 2/2011 | Chang et al. ............. 717/124 |
| 8,010,338 B2 | 8/2011 | Thorn |
| 8,027,438 B2 | 9/2011 | Daigle et al. |
| 8,112,497 B1 | 2/2012 | Gougousis et al. |
| 8,145,472 B2 | 3/2012 | Shore et al. |
| 8,170,868 B2 * | 5/2012 | Gamon et al. ................ 704/9 |
| 8,244,567 B2 | 8/2012 | Estill |
| 8,270,606 B2 | 9/2012 | Caskey et al. |
| 8,326,601 B2 | 12/2012 | Ribeiro et al. |
| 8,380,488 B1 * | 2/2013 | Liu et al. ...................... 704/4 |
| 8,392,173 B2 | 3/2013 | Davis et al. |
| 8,468,149 B1 | 6/2013 | Lung et al. |
| 8,473,555 B2 | 6/2013 | Lai et al. |
| 8,543,374 B2 | 9/2013 | Dymetman |
| 8,566,306 B2 | 10/2013 | Jones |
| 8,606,800 B2 | 12/2013 | Lagad et al. |
| 8,626,486 B2 | 1/2014 | Och et al. |
| 8,655,644 B2 | 2/2014 | Kanevsky et al. |
| 8,671,019 B1 | 3/2014 | Barclay et al. |
| 8,688,433 B2 | 4/2014 | Davis et al. |
| 8,688,451 B2 | 4/2014 | Grost et al. |
| 8,738,355 B2 | 5/2014 | Gupta et al. |
| 8,818,791 B2 | 8/2014 | Xiao et al. |
| 8,825,467 B1 | 9/2014 | Chen et al. |
| 8,825,469 B1 | 9/2014 | Duddu et al. |
| 8,832,204 B1 | 9/2014 | Gailloux |
| 8,838,437 B1 * | 9/2014 | Buryak et al. ................ 704/8 |
| 8,914,395 B2 | 12/2014 | Jiang |
| 8,918,308 B2 | 12/2014 | Caskey et al. |
| 8,935,147 B2 | 1/2015 | Stern et al. |
| 8,990,064 B2 | 3/2015 | Marcu et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 2001/0020225 A1 | 9/2001 | Zerber |
| 2001/0029455 A1 | 10/2001 | Chin et al. |
| 2002/0029146 A1 | 3/2002 | Nir |
| 2002/0037767 A1 | 3/2002 | Ebin |
| 2002/0152063 A1 | 10/2002 | Tokieda et al. |
| 2002/0169592 A1 | 11/2002 | Aityan |
| 2002/0198699 A1 | 12/2002 | Greene et al. |
| 2003/0009320 A1 | 1/2003 | Furuta |
| 2003/0033152 A1 | 2/2003 | Cameron |
| 2003/0046350 A1 | 3/2003 | Chintalapati et al. |
| 2003/0101044 A1 | 5/2003 | Krasnov |
| 2003/0125927 A1 | 7/2003 | Seme |
| 2003/0176995 A1 | 9/2003 | Sukehiro |
| 2004/0030750 A1 | 2/2004 | Moore et al. |
| 2004/0030781 A1 | 2/2004 | Etesse et al. |
| 2004/0044517 A1 | 3/2004 | Palmquist |
| 2004/0093567 A1 | 5/2004 | Schabes et al. |
| 2004/0102201 A1 | 5/2004 | Levin |
| 2004/0102956 A1 | 5/2004 | Levin |
| 2004/0102957 A1 | 5/2004 | Levin |
| 2004/0158471 A1 | 8/2004 | Davis et al. |
| 2004/0205671 A1 | 10/2004 | Sukehiro et al. |
| 2004/0210443 A1 | 10/2004 | Kuhn et al. |
| 2004/0267527 A1 | 12/2004 | Creamer et al. |
| 2005/0076240 A1 | 4/2005 | Appleman |
| 2005/0102130 A1 | 5/2005 | Quirk et al. |
| 2005/0160075 A1 | 7/2005 | Nagahara |
| 2005/0165642 A1 | 7/2005 | Brouze et al. |
| 2005/0171758 A1 | 8/2005 | Palmquist |
| 2005/0197829 A1 | 9/2005 | Okumura |
| 2005/0209844 A1 | 9/2005 | Wu et al. |
| 2005/0234702 A1 | 10/2005 | Komiya |
| 2005/0251384 A1 | 11/2005 | Yang |
| 2005/0283540 A1 | 12/2005 | Fux |
| 2006/0015812 A1 | 1/2006 | Cunningham et al. |
| 2006/0053203 A1 | 3/2006 | Mijatovic |
| 2006/0101021 A1 | 5/2006 | Davis et al. |
| 2006/0133585 A1 | 6/2006 | Daigle et al. |
| 2006/0136223 A1 | 6/2006 | Brun et al. |
| 2006/0167992 A1 | 7/2006 | Cheung et al. |
| 2006/0173839 A1 | 8/2006 | Knepper et al. |
| 2006/0206309 A1 | 9/2006 | Curry et al. |
| 2006/0271352 A1 | 11/2006 | Nikitin et al. |
| 2007/0016399 A1 | 1/2007 | Gao et al. |
| 2007/0050182 A1 | 3/2007 | Sneddon et al. |
| 2007/0077975 A1 | 4/2007 | Warda |
| 2007/0088793 A1 | 4/2007 | Landsman |
| 2007/0124202 A1 | 5/2007 | Simons |
| 2007/0129935 A1 | 6/2007 | Uchimoto et al. |
| 2007/0143410 A1 | 6/2007 | Kraft et al. |
| 2007/0168450 A1 | 7/2007 | Prajapat et al. |
| 2007/0218997 A1 | 9/2007 | Cho |
| 2007/0219774 A1 | 9/2007 | Quirk et al. |
| 2007/0219776 A1 * | 9/2007 | Gamon et al. ................. 704/9 |
| 2007/0276814 A1 | 11/2007 | Williams |
| 2007/0294076 A1 | 12/2007 | Shore et al. |
| 2008/0005319 A1 | 1/2008 | Anderholm et al. |
| 2008/0052289 A1 | 2/2008 | Kolo et al. |
| 2008/0097745 A1 | 4/2008 | Bagnato et al. |
| 2008/0126077 A1 | 5/2008 | Thorn |
| 2008/0147408 A1 | 6/2008 | Da Palma et al. |
| 2008/0176655 A1 | 7/2008 | James et al. |
| 2008/0177528 A1 | 7/2008 | Drewes |
| 2008/0183459 A1 | 7/2008 | Simonsen et al. |
| 2008/0243834 A1 | 10/2008 | Rieman et al. |
| 2008/0249760 A1 | 10/2008 | Marcu et al. |
| 2008/0274694 A1 | 11/2008 | Castell et al. |
| 2008/0281577 A1 | 11/2008 | Suzuki |
| 2008/0313534 A1 | 12/2008 | Cheung et al. |
| 2008/0320086 A1 | 12/2008 | Callanan et al. |
| 2009/0011829 A1 | 1/2009 | Yang |
| 2009/0068984 A1 | 3/2009 | Burnett |
| 2009/0100141 A1 | 4/2009 | Kirkland et al. |
| 2009/0106695 A1 | 4/2009 | Perry et al. |
| 2009/0125477 A1 | 5/2009 | Lu et al. |
| 2009/0204400 A1 | 8/2009 | Shields et al. |
| 2009/0221372 A1 | 9/2009 | Casey et al. |
| 2010/0015581 A1 | 1/2010 | DeLaurentis |
| 2010/0099444 A1 | 4/2010 | Coulter et al. |
| 2010/0138210 A1 | 6/2010 | Seo et al. |
| 2010/0145900 A1 | 6/2010 | Zheng et al. |
| 2010/0180199 A1 | 7/2010 | Wu et al. |
| 2010/0204981 A1 | 8/2010 | Ribeiro et al. |
| 2010/0241482 A1 | 9/2010 | Knyphausen et al. |
| 2010/0268730 A1 | 10/2010 | Kazeoka |
| 2010/0293230 A1 | 11/2010 | Lai et al. |
| 2010/0324894 A1 | 12/2010 | Potkonjak |
| 2011/0022381 A1 | 1/2011 | Gao et al. |
| 2011/0066421 A1 | 3/2011 | Lee et al. |
| 2011/0071817 A1 * | 3/2011 | Siivola ........................ 704/8 |
| 2011/0077933 A1 | 3/2011 | Miyamoto et al. |
| 2011/0077934 A1 | 3/2011 | Kanevsky et al. |
| 2011/0082683 A1 | 4/2011 | Soricut et al. |
| 2011/0082684 A1 | 4/2011 | Soricut et al. |
| 2011/0098117 A1 | 4/2011 | Tanaka |
| 2011/0191096 A1 | 8/2011 | Sarikaya et al. |
| 2011/0213607 A1 | 9/2011 | Onishi |
| 2011/0219084 A1 | 9/2011 | Borra et al. |
| 2011/0238406 A1 | 9/2011 | Chen et al. |
| 2011/0238411 A1 | 9/2011 | Suzuki |
| 2011/0246881 A1 | 10/2011 | Kushman et al. |
| 2011/0307356 A1 | 12/2011 | Wiesinger |
| 2011/0307495 A1 | 12/2011 | Shoshan |
| 2011/0320019 A1 | 12/2011 | Lanciani et al. |

(56) References Cited

U.S. PATENT DOCUMENTS

| | | | |
|---|---|---|---|
| 2012/0109631 A1 | 5/2012 | Gopal et al. | |
| 2012/0156668 A1 | 6/2012 | Zelin | |
| 2012/0173502 A1 | 7/2012 | Kumar et al. | |
| 2012/0179451 A1 | 7/2012 | Miyamoto et al. | |
| 2012/0209852 A1 | 8/2012 | Dasgupta et al. | |
| 2012/0226491 A1* | 9/2012 | Yamazaki et al. | 704/8 |
| 2012/0240039 A1 | 9/2012 | Walker et al. | |
| 2012/0246564 A1* | 9/2012 | Kolo | 715/264 |
| 2012/0262296 A1 | 10/2012 | Bezar | |
| 2012/0265518 A1 | 10/2012 | Lauder | |
| 2013/0084976 A1 | 4/2013 | Kumaran et al. | |
| 2013/0085747 A1 | 4/2013 | Li et al. | |
| 2013/0091429 A1 | 4/2013 | Weng et al. | |
| 2013/0130792 A1 | 5/2013 | Crocker et al. | |
| 2013/0138428 A1 | 5/2013 | Chandramouli et al. | |
| 2013/0144599 A1 | 6/2013 | Davis et al. | |
| 2013/0173247 A1 | 7/2013 | Hodson | |
| 2013/0197896 A1 | 8/2013 | Chalabi et al. | |
| 2013/0211821 A1 | 8/2013 | Tseng et al. | |
| 2014/0006003 A1 | 1/2014 | Soricut et al. | |
| 2014/0058807 A1 | 2/2014 | Altberg et al. | |
| 2014/0142917 A1 | 5/2014 | D'Penha | |
| 2014/0188453 A1 | 7/2014 | Marcu et al. | |
| 2014/0199975 A1 | 7/2014 | Lou et al. | |
| 2014/0200878 A1 | 7/2014 | Mylonakis et al. | |
| 2014/0208367 A1 | 7/2014 | DeWeese et al. | |
| 2014/0229154 A1 | 8/2014 | Leydon et al. | |
| 2014/0229155 A1 | 8/2014 | Leydon et al. | |
| 2014/0303961 A1 | 10/2014 | Leydon et al. | |
| 2014/0330760 A1 | 11/2014 | Meier et al. | |
| 2014/0337989 A1 | 11/2014 | Orsini et al. | |
| 2015/0006148 A1* | 1/2015 | Goldszmit et al. | 704/8 |

OTHER PUBLICATIONS

"Chromium-compact-language-detector," downloaded Dec. 22, 2014, from <https://code.google.com/p/chromium-compact-language-detector/>, 1 page.
"CJK Unified Ideographs," downloaded Dec. 22, 2014, from <http://en.wikipedia.org/wiki/CJK_Unified_Ideographs>, 11 pages.
"cld2," downloaded Dec. 22, 2014, from <https://code.google.com/p/cld2/>, 2 pages.
"Cyrillic script in Unicode," downloaded Dec. 22, 2014, from <http://en.wikipedia.org/wiki/Cyrillic_script_in_Unicode>, 22 pages.
"Detect Method," downloaded Dec. 22, 2014, from <http://msdn.microsoft.com/en-us/library/ff512411.aspx>, 5 pages.
"GitHub," downloaded Dec. 22, 2014, from <https://github.com/feedbackmine/language_detector>, 1 page.
"Google Translate API," downloaded Dec. 22, 2014, from <https://cloud.google.com/translate/v2/using_rest>, 12 pages.
"Idig (Language Detection with Infinity Gram)," downloaded Dec. 22, 2014, from <https://github.com/shuyo/Idig>, 3 pages.
"Language identification," downloaded Dec. 22, 2014, from <http://en.wikipedia.org/wiki/Language_identification>, 5 pages.
"Languages and Scripts, CLDR Charts," downloaded Dec. 22, 2014, from <http://www.unicode.org/cldr/charts/latest/supplemental/languages_and_scripts.html>, 23 pages.
"Latin script in Unicode," downloaded Dec. 22, 2014, from <http://en.wikipedia.org/wiki/Latin_script_in_Unicode>, 5 pages.
"Mimer SQL Unicode Collation Charts," downloaded Dec. 22, 2014, from <http://developer.mimer.com/charts/index.tml>, 2 pages.
"Scripts and Languages," downloaded Dec. 22, 2014, from <http://www.unicode.org/cldr/charts/latest/supplemental/scripts_and_languages.html>, 23 pages.
"Supported Script," downloaded Dec. 22, 2014, from <http://www.unicode.org/standard/supported.html>, 3 pages.
"Unicode Character Ranges," downloaded Dec. 22, 2014, from <http://jrgraphix.net/research/unicode_blocks.php>, 1 page.
"Uscript.h File Reference," downloaded Dec. 22, 2014, from <http://icu-project.org/apiref/icu4c/uscript_8h.html>, 34 pages.

Baldwin, et al., "Language identification: The long and the short of the matter," In Proceedings of NAACL-HLT, 2010, 9 pgs.
Bashir, et al., "Language identification from text using n-gram based cumulative frequency addition," In Proceedings of Student/Faculty Research Day, CSIS, Pace University, 2004, 8 pgs.
Bergsma et al., "Language identification for creating language-specific Twitter collections," In Proceedings of the Second Workshop on Language in Social Media, 2012, 10 pgs.
Carter, et al., "Microblog language identification: Overcoming the limitations of short, unedited and idiomatic text," Language Resources and Evaluation, 2013, vol. 47, No. 1, pp. 195-215.
Cavnar, et al., "N-gram-based text categorization," In Proceedings of the Third Symposium on Document Analysis and Information Retrieval, 1994, 14 pgs.
Ceylan, et al., "Language identification of search engine queries," In Proceedings of ACL-IJCNLP, 2009, 9 pgs.
Chang, et al., "LIBSVM: A library for support vector machines, ACM Transactions on Intelligent Systems and Technology," vol. 2, No. 27, pp. 1-39, 2011.
Dunning, "Statistical identification of language," Computing Research Laboratory, New Mexico State University, 1994, 31 pgs.
Fan, et al., "LIBLINEAR: A library for large linear classification," Journal of Machine Learning Research, 2008, vol. 9, pp. 1871-1874.
Foster, et al., "#hardtoparse: POS tagging and pursing the twitterverse," In Proceedings of the AAAI Workshop on Analyzing Microtext, 2011, 7 pgs.
Gottron, et al., "A comparison of language identification approaches on short, query-style texts," In Advances in information retrieval, 2010, pp. 611-614.
Grothe, et al., "A comparative study on language identification methods," In Proceedings of LREC, 2008, 6 pgs.
Hughes, et al., "Reconsidering language identification for written language resources," In Proceedings of LREC, 2006, 5 pgs.
Liu, et al., "A broad-coverage normalization system for social media language," In Proceedings of ACL, 2012, 10 pgs.
Liu, et al., "Recognizing named entities in tweets," In Proceedings of ACL-HLT, 2011, 9 pgs.
Lui et al., "Accurate Language Identification of Twitter Messages," Proceedings of the 5th Workshop on Language Analysis for Social Media3 (LASM) @ EACL 2014, pp. 17-25, Gothenburg, Sweden, Apr. 26-30, 2014.
Lui, et al., "Automatic Detection and Language Identification of Multilingual Documents," Transactions of the Association for Computational Linguistics, pp. 27-40, published Feb. 2014.
Lui, et al., "Cross-domain Feature Selection for Language Identification," Proceedings of the 5th International Joint Conference on Natural Language Processing, pp. 553-561, Chiang Mai, Thailand, Nov. 8-13, 2011.
Lui, et al., "langid.py: An Off-the-shelf Language Identification Tool," Proceedings of the 50th Annual Meeting of the Association for Computational Linguistics, pp. 25-30, Jeju, Republic of Korea, Jul. 8-14, 2012.
Monteith, Kristine, et al., "Turning Bayesian Model Averaging Into Bayesian Model Combination," Proceedings of the International Joint Conference on Neural Networks IJCNN'11. pp. 2657-2663, 2011.
Ritter, et al., "Named entity recognition in tweets: An experimental study," In Proceedings of EMNLP, 2011, pp. 1524-1534.
Tromp, et al., "Graph-based n-gram language identification on short texts," In Proceedings of the 20th Machine Learning conference of Belgium and The Netherlands, 2011, 8 pgs.
Vatanen, et al., "Language identification of short text segments with n-gram models," In Proceedings of LREC, 2010, 8 pgs.
Vogel, et al., "Robust language identification in short, noisy texts: Improvements to LIGA," In Proceedings of the Third International Workshop on Mining Ubiquitous and Social Environments, 2012, 8 pgs.
Xia, et al., "Applying NLP Technologies to the Collection and Enrichment of Language Data on the Web to Aid Linguistic Research," Proceedings of the EACL 2009 Workshop on Language Technology and Resources for Cultural Heritage, Social Sciences, Humanities, and Education—LaTeCH—SHELT&R 2009, Athens, Greece, Mar. 30, 2009, pp. 50-58.

(56) References Cited

OTHER PUBLICATIONS

Callison-Burch, Chris, "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.
Little, "Turkit: Tools for Iterative Tasks on Mechanical Turk," Visual Languages and Human-Centric Computing, XPO31551118, IEEE, Sep. 20, 2009, pp. 252-253.
Centric Computing, XP031551118, IEEE, Sep. 20, 2009, pp. 252-253. Popovic, Maja et al., "Syntax-oriented evaluation measures for machine translation output,".
Shieber, S.M., and Nelken R.; "Abbreviated Text Input Using Language Modeling," Natural Language Eng; 13(2):165-183; Jun. 2007.
Zaidan, Omar F. et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.
Aikawa et al., "The Impact of Crowdsourcing Post-editing with the Collaborative Translation Framework," JapTAL 2012, LNAI 7614, pp. 1-10. Springer-Verlag Berlin Heidelberg 2012.
Ambati et al., "Collaborative Workflow for Crowdsourcing Translation," Proceedings of the ACM 2012 conference on Computer Supported Cooperative Work, ACM, 2012.
Callison-Burch et al., "Creating Speech and Language DataWith Amazon's Mechanical Turk," Proceedings of the NAACL HLT 2010 Workshop on Creating Speech and Language Data with Amazon's Mechanical Turk, pp. 1-12, 2010.
Int'l Search Report and Written Opinion of the ISA/US in PCT/US2014/015632; Jul. 8, 2014; 8 pgs.
Partial Int'l Search Report of the ISA/EP in PCT/US2014/040676; Feb. 17, 2015; 5 pgs.
Int'l Search Report and Written Opinion of the ISA/US in PCT/US2014/040676; May 6, 2015; 16pgs.
Hulin et al., "Applications of Item Response Theory to Analysis of Attitude Scale Translations," American Psychological Association; vol. 67(6); 51 pgs.; Dec. 1982.
Int'l Search Report and Written Opinion of the ISA/US in PCT/US2014/061141; 13pgs.; Jun. 16, 2015.
Papineni, K., et al. "BLEU: A Method for Automatic Evaluation of Machine Translation," Proc. 40th annual Meeting on Assoc. for Computational Linguistics (ACL); Jul. 2002; pp. 311-318.
Qureshi et al., Collusion Detection and Prevention with FIRE+ Trust and Reputation Model, 2010, IEEE, Computer and Information Technology (CIT), 2010 IEEE 10th International Conference, pp. 2548-2555; Jun. 2010.
Rouse, M., "Parallel Processing," Search Data Center.com; Mar. 27, 2007; 2pgs.
"Multi Core and Parallel Processing," downloaded on Jun. 30, 2015 from stackoverflow.com/questions/1922465/multi-core-and-parallel-processing, published Dec. 17, 2009; 2pgs.
"CJK Unified Ideographs (Unicode block)," downloaded Dec. 22, 2014, from <http://en.wikipedia.org/wiki/CJK_Unified_Ideographs_(Unicode block)>; 1 pg.
Ahmed, B., et al., "Language Identification from Text Using n-gram Based Cumulative Frequency Addition," In Proceedings of Student/Faculty Research Day, CSIS, Pace University; pp. 12.1-12.8; May 2004.

* cited by examiner

SYSTEMS AND METHODS FOR LANGUAGE DETECTION

BACKGROUND

The present disclosure relates to language detection and, in particular, to systems and methods for detecting languages in short text messages.

In general, language detection or identification is a process in which a language present in a body of text is detected automatically based on the content of the text. Language detection is useful in the context of automatic language translation, where the language of a text message must generally be known before the message can be translated accurately into a different language.

While traditional language detection is usually performed on a collection of many words and sentences (i.e., on the document level), a particularly challenging domain is the chat text domain, where messages often include only a few words (e.g., four or less), some or all of which may be informal and/or misspelled. In the chat text domain, existing language detection approaches have proven to be inaccurate and/or slow, given the lack of information and the informalities present in such messages.

SUMMARY

Embodiments of the systems and methods described herein are used to detect the language in a text message based on, for example, content of the message, information about the keyboard used to generate the message, and/or information about the language preferences of the user who generated the message. Compared to previous language detection techniques, the systems and methods described herein are generally faster and more accurate, particularly for short text messages (e.g., of four words or less).

In various examples, the systems and methods use a plurality of language detection tests and classifiers to determine probabilities associated with possible languages in a text message. Each language detection test may output a set or vector of probabilities associated with the possible languages. The classifiers may combine the output from the language detection tests to determine a most likely language for the message. The particular language detection test(s) and classifier(s) chosen for the message may depend on a predicted accuracy, a confidence score, and/or a linguistic domain for the message.

In one aspect, the invention relates to a computer-implemented method of identifying a language in a message. The method includes: performing a plurality of different language detection tests on a message associated with a user, each language detection test determining a respective set of scores, each score in the set of scores representing a likelihood that the message is in one of a plurality of different languages; providing one or more combinations of the score sets as input to one or more distinct classifiers; obtaining as output from each of the one or more classifiers a respective indication that the message is in one of the plurality of different languages, the indication including a confidence score; and identifying the language in the message as being the indicated language from one of the one or more classifiers, based on at least one of the confidence score and an identified linguistic domain.

In certain examples, a particular classifier is a supervised learning model, a partially supervised learning model, an unsupervised learning model, or an interpolation. Identifying the language in the message may include selecting the indicated language based on the confidence score. Identifying the language in the message may include selecting the classifier based on the identified linguistic domain. In some instances, the linguistic domain is or includes video games, sports, news, parliamentary proceedings, politics, health, and/or travel.

In some examples, the message includes two or more of the following: a letter, a number, a symbol, and an emoticon. The plurality of different language detection tests may include at least two methods selected from the group consisting of a byte n-gram method, a dictionary-based method, an alphabet-based method, a script-based method, and a user language profile method. The plurality of different language detection tests may be performed simultaneously (e.g., with parallel processing). The one or more combinations may include score sets from a byte n-gram method and a dictionary-based method. The one or more combinations may further include score sets from the user language profile method and/or the alphabet-based method.

In another aspect, the invention relates to a system for identifying a language in a message. The system includes a computer storage device having instructions stored thereon. The system also includes a data processing apparatus configured to execute the instructions to perform operations that include: performing a plurality of different language detection tests on a message associated with a user, each language detection test determining a respective set of scores, each score in the set of scores representing a likelihood that the message is in one of a plurality of different languages; providing one or more combinations of the score sets as input to one or more distinct classifiers; obtaining as output from each of the one or more classifiers a respective indication that the message is in one of the plurality of different languages, the indication including a confidence score; and identifying the language in the message as being the indicated language from one of the one or more classifiers, based on at least one of the confidence score and an identified linguistic domain.

In certain examples, a particular classifier is a supervised learning model, a partially supervised learning model, an unsupervised learning model, or an interpolation. Identifying the language in the message may include selecting the indicated language based on the confidence score. Identifying the language in the message may include selecting the classifier based on the identified linguistic domain. In some instances, the linguistic domain is or includes video games, sports, news, parliamentary proceedings, politics, health, and/or travel.

In some examples, the message includes two or more of the following: a letter, a number, a symbol, and an emoticon. The plurality of different language detection tests may include at least two methods selected from the group consisting of a byte n-gram method, a dictionary-based method, an alphabet-based method, a script-based method, and a user language profile method. The plurality of different language detection tests may be performed simultaneously (e.g., with parallel processing). The one or more combinations may include score sets from a byte n-gram method and a dictionary-based method. The one or more combinations may further include score sets from the user language profile method and/or the alphabet-based method.

In another aspect, the invention relates to a computer program product stored in one or more storage devices for controlling a processing mode of a data processing apparatus. The computer program product is executable by the data processing apparatus to cause the data processing apparatus to perform operations that include: performing a plurality of different language detection tests on a message associated with a user, each language detection test determining a respective set of scores, each score in the set of scores representing a likelihood that the message is in one of a plurality of different languages; providing one or more combinations of the score sets as input to one or more distinct classifiers; obtaining as output from each of the one or more classifiers a respective indication that the message is in one of the plurality of different languages, the indication including a confidence score; and identifying the language in the message as being the indicated language from one of the one or more classifiers, based on at least one of the confidence score and an identified linguistic domain.

In certain examples, a particular classifier is a supervised learning model, a partially supervised learning model, an unsupervised learning model, or an interpolation. Identifying the language in the message may include selecting the indicated language based on the confidence score. Identifying the language in the message may include selecting the classifier based on the identified linguistic domain. In some instances, the linguistic domain is or includes video games, sports, news, parliamentary proceedings, politics, health, and/or travel.

In some examples, the message includes two or more of the following: a letter, a number, a symbol, and an emoticon. The plurality of different language detection tests may include at least two methods selected from the group consisting of a byte n-gram method, a dictionary-based method, an alphabet-based method, a script-based method, and a user language profile method. The plurality of different language detection tests may be performed simultaneously (e.g., with parallel processing). The one or more combinations may include score sets from a byte n-gram method and a dictionary-based method. The one or more combinations may further include score sets from the user language profile method and/or the alphabet-based method.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims

DETAILED DESCRIPTION

In general, the language detection systems and methods described herein can be used to identify the language in a text message when language information for the message (e.g., keyboard information from a client device) is absent, malformed or unreliable. The systems and methods improve the accuracy of language translation methods used to translate text messages from one language to another. Language translation generally requires the source language to be identified accurately, otherwise the resulting translation may be inaccurate.

Figure 1A:
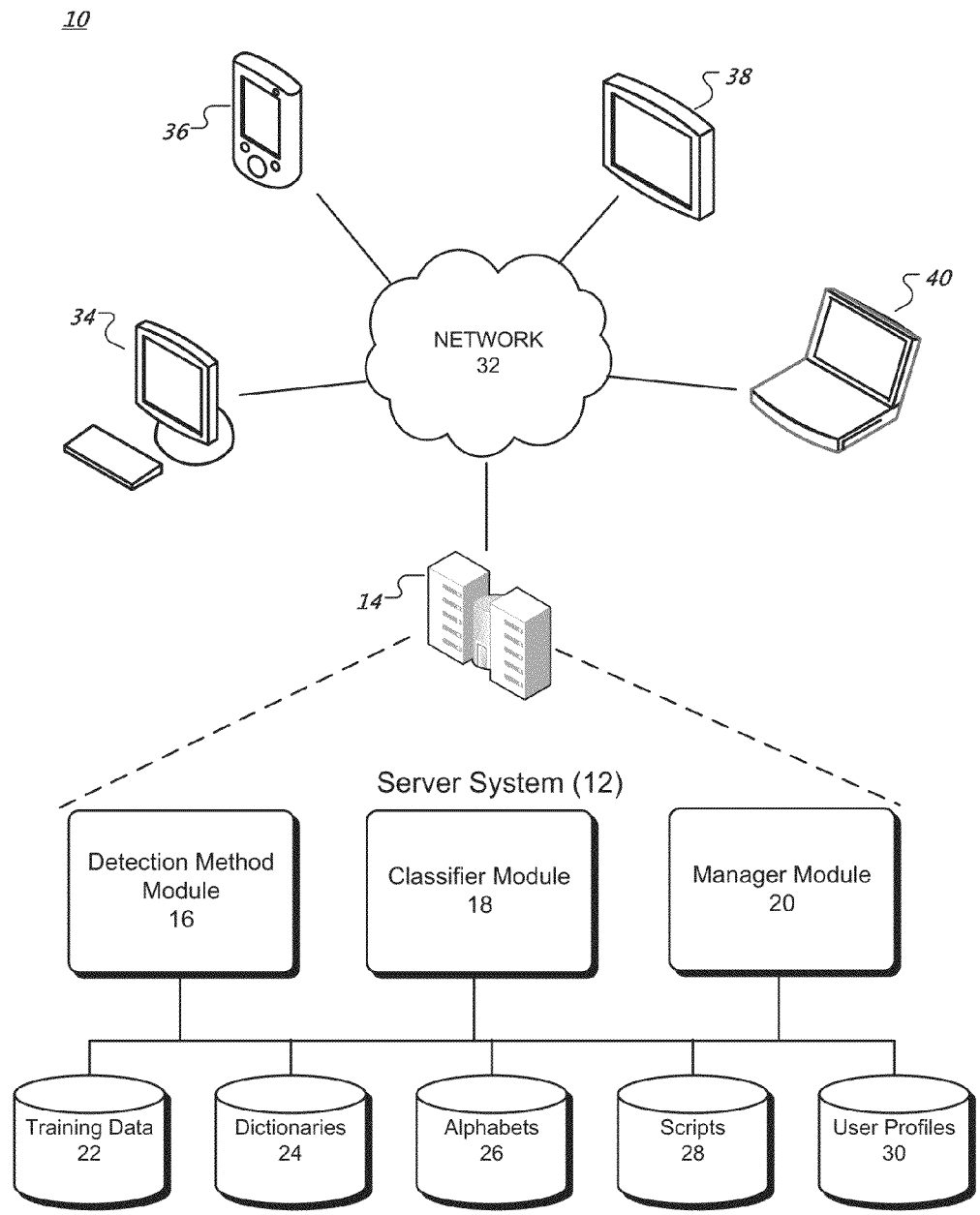
FIG. 1A is a diagram of an example system for performing language detection.

FIG. 1A illustrates an example system 10 for detecting a language in a message, such as a text message or an audio message. A server system 12 provides message analysis and language detection functionality. The server system 12 comprises software components and databases that can be deployed at one or more data centers 14 in one or more geographic locations, for example. The server system 12 software components comprise a detection method module 16, a classifier module 18, and a manager module 20. The software components can comprise subcomponents that can execute on the same or on different individual data processing apparatus. The server system 12 databases comprise training data 22, dictionaries 24, alphabets 26, scripts 28, and user profile information 30. The databases can reside in one or more physical storage systems. The software components and data will be further described below.

An application such as a web-based application can be provided as an end-user application to allow users to provide messages to the server system 12. The end-user applications can be accessed through a network 32 by users of client devices, such as a personal computer 34, a smart phone 36, a tablet computer 38, and a laptop computer 40. Other client devices are possible. The user messages may be accompanied by information about the devices used to create the messages, such as information about the keyboard, client device, and/or operating system used to create the messages.

Although FIG. 1A depicts the classifier module 18 and the manager module 20 as being connected to the databases (i.e., training data 22, dictionaries 24, alphabets 26, scripts 28, and user profile information 30), the classifier module 18 and/or the manager module 20 are not necessarily connected to some or all of the databases. In general, the classifier module 18 receives input from the detection method module 16, and the manager module 20 receives input from the classifier module 18. No other inputs are required to be received by the classifier module 18 and/or the manager module 20.

Figure 1B:
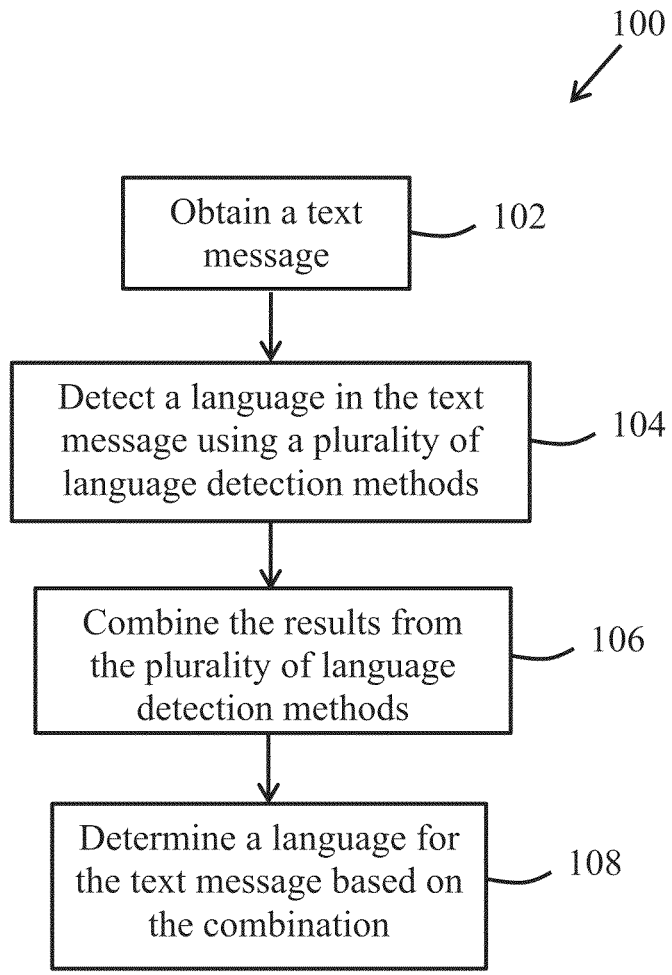
FIG. 1B is a flowchart of an example method of detecting a language in a text message.

FIG. 1B illustrates an example method 100 that uses the system 10 to detect a language in a message. The method 100 begins by receiving or obtaining (step 102) a text message generated by a user. The text message is analyzed (step 104) using one or more language detection methods (e.g., from the detection method module 16) that each provide an indication of the language or languages present in the message. The output from the language detection methods is then combined (step 106) using one or more classifiers (e.g., from the classifier module 18) that provide a further indication of the language present in the message. The one or more classifiers may include, for example, a supervised learning model, a partially supervised learning model, an unsupervised learning model, and/or an interpolation. The output from the one or more classifiers is then used to determine (step 108) the language in the message (e.g., using the manager module 20).

In some implementations, the language indication from the one or more classifiers is selected by the manager module 20 according to a computed confidence score and/or a linguistic domain. For example, the classifiers may compute a confidence score indicating a degree of confidence associated with the language prediction. Additionally or alternatively, certain classifier output may be selected according to the linguistic domain associated with the user or the message. For example, if the message originated in a computer gaming environment, a particular classifier output may be selected as providing the most accurate language prediction. Likewise, if the message originated in the context of sports (e.g., regarding a sporting event), a different classifier output may be selected as being more appropriate for the sports linguistic domain. Other possible linguistic domains include, for example, news, parliamentary proceedings, politics, health, travel, web pages, newspaper articles, and microblog messages. In general, certain language detection methods or combinations of language detection methods (e.g., from a classifier) may be more accurate for certain linguistic domains, when compared to other linguistic domains. In some implementations, the domain can be determined based on the presence of words from a domain vocabulary in a message. For example, a domain vocabulary for computer gaming could include common slang words used by gamers.

The language detection methods used by the detection method module 16 may include, for example, an n-gram method (e.g., a byte n-gram method), a dictionary-based method, an alphabet-based method, a script-based method, and a user language profile method. Other language detection methods are possible. Each of these language detection methods may be used to detect a language present in a message. The output from each method may be, for example, a set or vector of probabilities associated with each possible language in the message. In some instances, two or more of the language detection methods may be performed simultaneously, using parallel computing, which can reduce computation times considerably.

In one implementation, a byte n-gram method uses byte n-grams instead of word or character n-grams to detect languages. The byte n-gram method is preferably trained over a mixture of byte n-grams (e.g., with $1 \leq n \leq 4$), using a naive Bayes classifier having a multinomial event model. The model preferably generalizes to data from different linguistic domains, such that the model's default configuration is accurate over a diverse set of domains, including newspaper articles, online gaming, web pages, and microblog messages. Information about the language identification task may be integrated from a variety of domains.

The task of attaining high accuracy may be relatively easy for language identification in a traditional text categorization setting, for which in-domain training data is available. This task may be more difficult when attempting to use learned model parameters for one linguistic domain to classify or categorize data from a separate linguistic domain. This problem may be addressed by focusing on important features that are relevant to the task of language identification. This may be based on, for example, a concept called information gain, which was originally introduced for decision trees as a splitting criteria, and later found to be useful for selecting features in text categorization. In certain implementations, a detection score is calculated that represents the difference in information gain relative to domain and language. Features having a high detection score may provide information about language without providing information about domain. For simplicity, the candidate feature set may be pruned before information gain is calculated, by means of a feature selection based on term-frequency.

Figure 2:
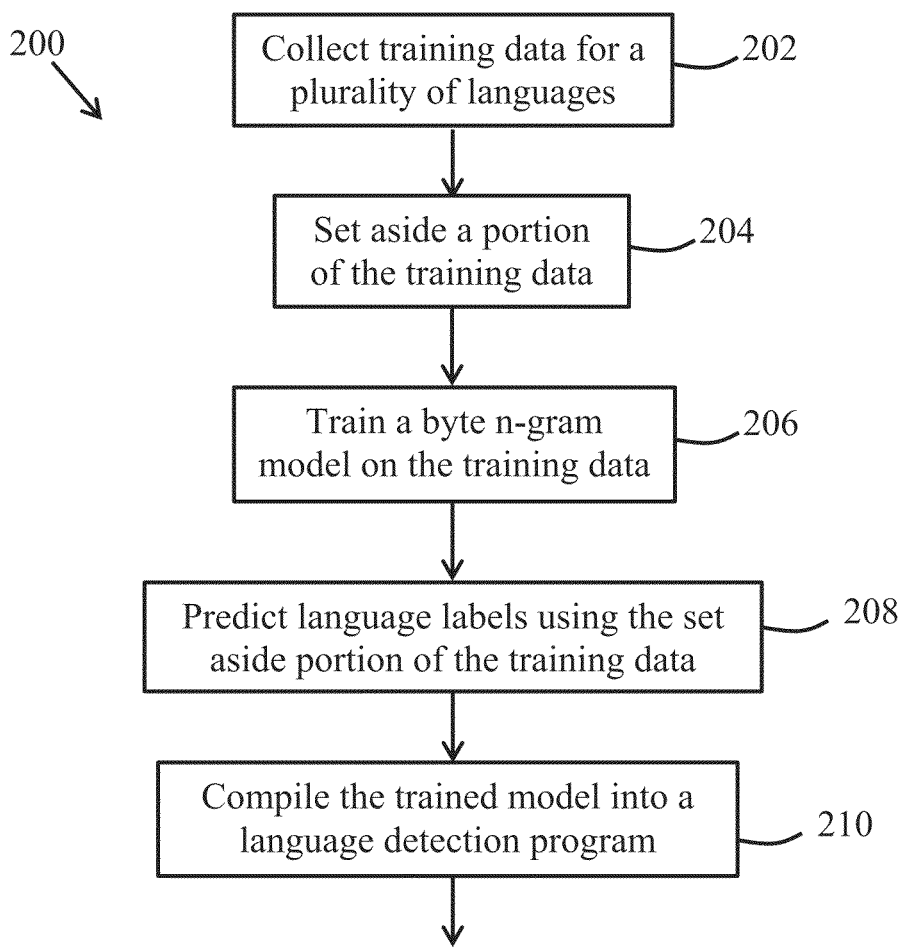
FIG. 2 is a flowchart of an example n-gram method of detecting a language in a text message.

Referring to FIG. 2, an example byte n-gram method 200 begins by training the method using the training data 22. For example, the method may be trained over a mixture of byte n-grams, using the naive Bayes classifier having the multinomial event model. Training data 22 is preferably collected (step 202) for a wide number and variety of languages and adjusted so that the amount of data available per language is made uniform. A small portion of the training data 22 is set aside (step 204) as a test set. Once the training data 22 is selected, a byte n-gram model is trained (step 206) on the data 22 with appropriate smoothing and backoff techniques. The input features to the model are byte streams from each input sentence, and since the source language label is known for these sentences, the model adjusts its parameters to learn byte sequences typical to a given language. The test set that was isolated in the beginning is then used to predict (step 208) language labels based on the model that had been trained. The accuracy of prediction gives the performance of this byte n-gram language identification system. In some instances, it is difficult to train such a byte n-gram system for each linguistic domain by collecting data across numerous languages for said domain. The difficulty arises from a lack of sufficient data per domain. Hence, these byte n-gram systems are typically trained to cater to a generic domain and not to any specific domains. The trained model may be compiled (step 210) into a program along with intermediate machine parameters. The program may serve as a general purpose language identification system.

In general, the dictionary-based language detection method counts the number of tokens or words belonging to each language by looking up words in a dictionary or other word listing associated with the language. The language having the most words in the message is chosen as the best language. In the case of multiple best languages, the more frequent or commonly used of the best languages may be chosen. The language dictionaries may be stored in the dictionaries database 24.

Figure 3:
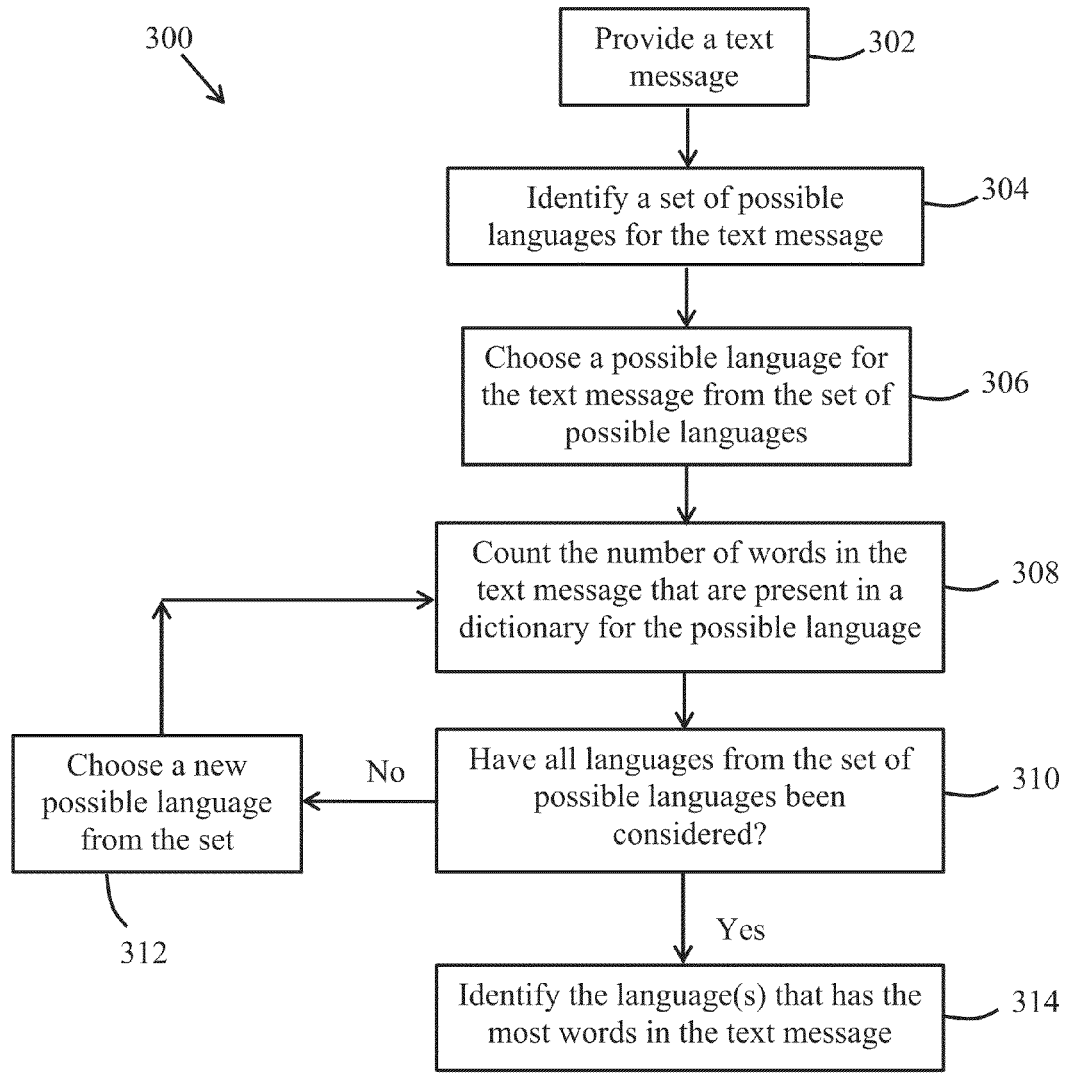
FIG. 3 is a flowchart of an example dictionary-based method of detecting a language in a text message.

FIG. 3 is a flowchart of an example dictionary-based language detection method 300. A text message is provided (step 302) and a set of possible languages for the text message is identified (step 304). A first possible language is then chosen (step 306) from the set. The words in the text message that are present in a dictionary for the possible language are counted (step 308). If additional possible languages from the set have not yet been considered (step 310), a new possible language is selected (step 312), and step 308 is repeated. Once all possible languages from the set have been considered, the language with the most words in the text message may be identified (step 314) as the language in the message. Alternatively or additionally, the method may be used to compute the likelihood that a language is in the message, for each language in the set. For example, the output from the dictionary-based method may be a vector of probabilities for each language in the set.

To ensure accuracy of the dictionary-based language detection method, particularly for short sentences, it is preferable to use dictionaries that include informal words or chat words (e.g., abbreviations, acronyms, slang words, and profanity), in additional to formal words. Informal words are commonly used in short text communications and in chat rooms. The dictionaries are preferably augmented to include informal words on an ongoing basis, as new informal words are developed and used.

The alphabet-based method is generally based on character counts for each language's alphabet and relies on the observation that many languages have unique alphabets or different sets of characters. For example, Russian, English, Korean, and Japanese each use a different alphabet. Although the alphabet-based method may be unable to distinguish some languages precisely (e.g., languages that use similar alphabets, such as Latin languages), the alphabet-based method can generally detect certain languages quickly. In some instances it is preferable to use the alphabet-based method in combination with one or more other language detection methods (e.g., using a classifier), as discussed herein. The language alphabets may be stored in the alphabets database 26.

Figure 4:
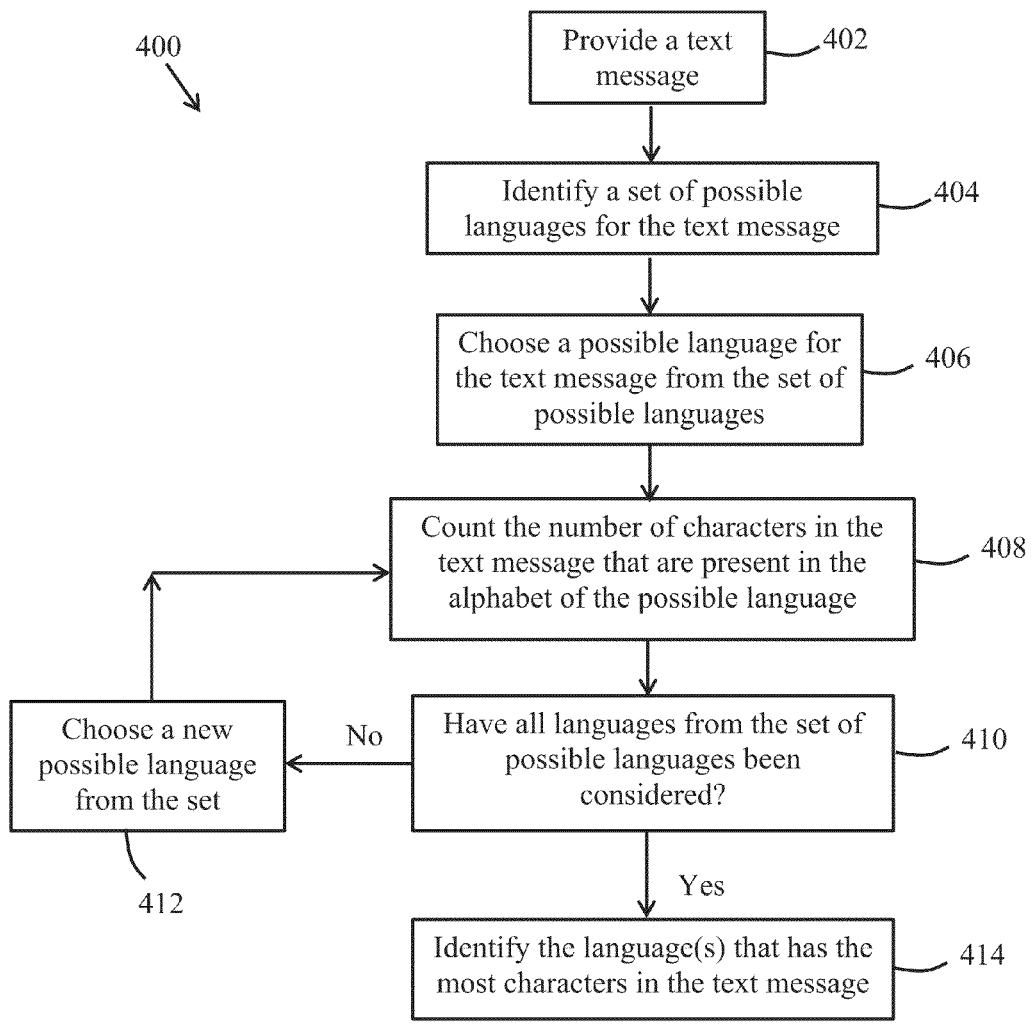
FIG. 4 is a flowchart of an example alphabet-based method of detecting a language in a text message.

FIG. 4 is a flowchart of an example alphabet-based language detection method 400. A text message is provided (step 402) and a set of possible languages for the text message is identified (step 404). A first possible language is then chosen (step 406) from the set. The characters in the text message that are present in an alphabet for the possible language are counted (step 408). If additional possible languages from the set have not yet been considered (step 410), a new possible language is selected (step 412), and step 408 is repeated. Once all possible languages from the set have been considered, the language with the most characters in the text message may be identified (step 414) as the language in the message. Alternatively or additionally, the alphabet-based method may be used to compute a likelihood that a language is in the message, for each language in the set. For example, the output from the alphabet-based method may be a vector of probabilities for each language in the set.

In general, the script-based language detection method determines the character counts for each possible script (e.g. Latin script, CJK script, etc.) that is present in the message. The script-based method relies on the observation that different languages may use different scripts, e.g., Chinese and English. The method preferably uses a mapping that maps a script to a list of languages that use the script. For example, the mapping may consider the UNICODE values for the characters or symbols present in the message, and these UNICODE values may be mapped to a corresponding language or set of possible languages for the message. The language scripts and UNICODE values or ranges may be stored in the scripts database 28.

Figure 5:
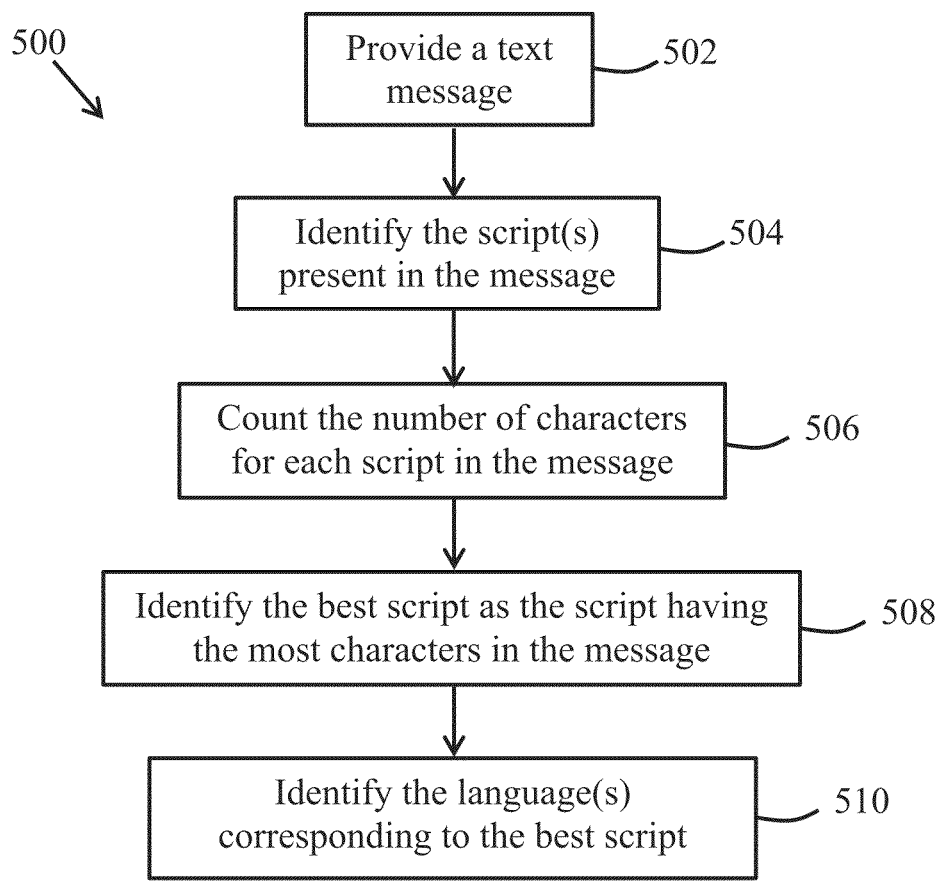
FIG. 5 is a flowchart of an example script-based method of detecting a language in a text message.

Referring to FIG. 5, in an example script-based method 500, a text message is provided (step 502) and the scripts present in the message are identified (504). The number of characters falling into each script is then counted (step 506). The script with the highest number of characters is considered to be the best script (step 508), and the languages corresponding to the best script are identified (step 510). When the best script corresponds to only one language, that language may be considered to be the best language. Otherwise, when the best script corresponds more than one language, additional language detection methods may be used to do further detection. In some implementations, the output from the script-based method is a set of probabilities (e.g., in vector form) for each possible language in the message.

The user language profile based method uses the user profiles database 30, which stores historical messages sent by various users. The languages of these stored messages are detected using, for example, one or more other language detection methods described herein (e.g., the byte n-gram method), to identify the language(s) used by each user. For example, if all of a user's prior messages are in Spanish, the language profile for that user may indicate the user's preferred language is Spanish. Likewise, if a user's prior messages are in a mixture of different languages, the language profile for the user may indicate probabilities associated with the different languages (e.g., 80% English, 15% French, and 5% Spanish). In general, the user language profile based method addresses language detection issues associated with very short messages, which often do not have enough information in them to make an accurate language determination. In such an instance, the language preference of a user can be used to predict the language(s) in the user's messages, by assuming the user will continue to use the language(s) he or she has used previously.

Figure 6:
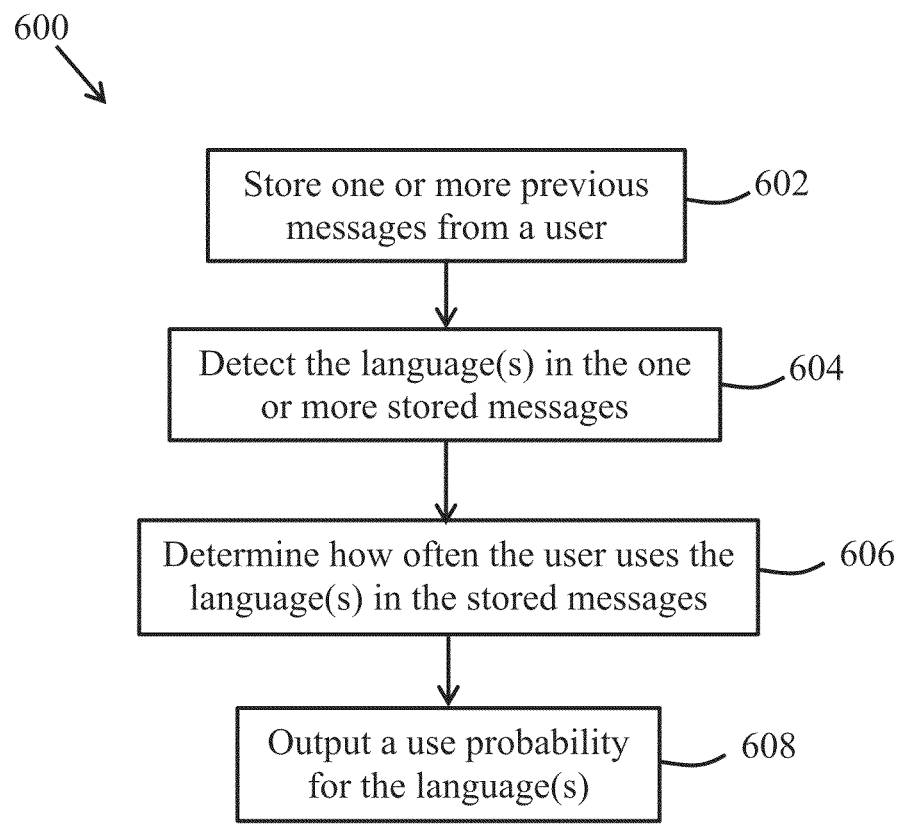
FIG. 6 is a flowchart of an example user language profile method of detecting a language in a text message.

Referring to FIG. 6, an example user language profile detection method 600 begins by storing (step 602) a user's previous messages and detecting (step 604) the language(s) present in the stored messages. The frequency with which different language(s) appear in the user's message is determined (606) and outputted (step 608).

Figure 7:
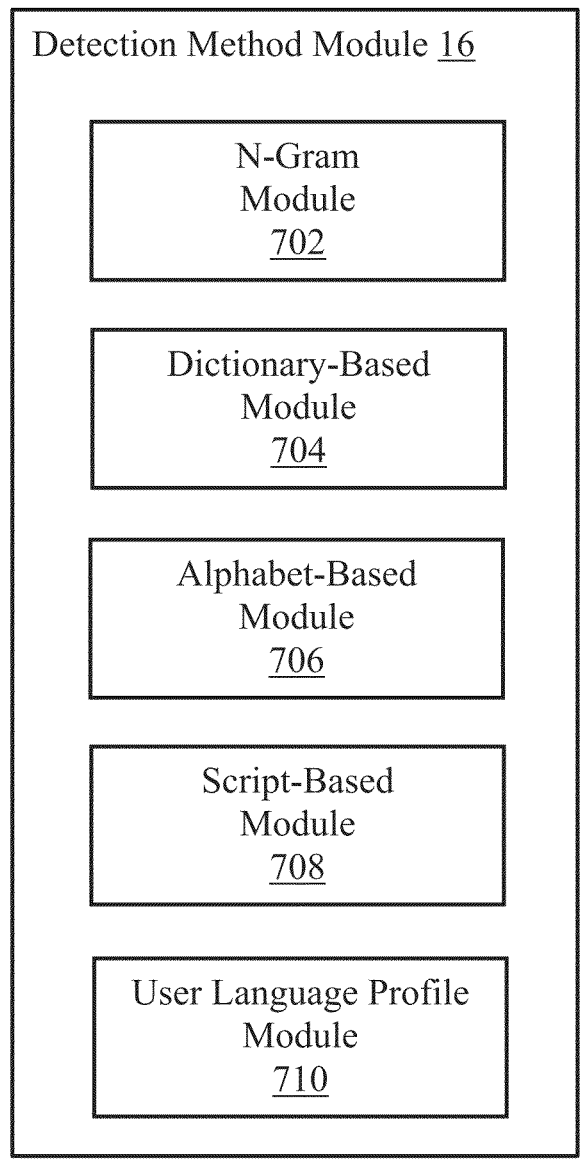
FIG. 7 is a schematic diagram of an example language detection method module.

Referring to FIG. 7, the various language detection methods may be incorporated into the detection method module 16. A text message may be input into the detection method module 16, and one or more of the language detection methods may identify the language(s) in the message. For example, each language detection method may provide a vector of probabilities where each probability in the vector is associated with a possible language in the message and represents the likelihood that the message is in the given language. Due to the different methods employed and the information available in the message, the probabilities from each language detection method may not be consistent. The detection method module 16 may include or utilize, for example, an n-gram module 702 for performing an n-gram detection method (e.g., the byte n-gram detection method 200), a dictionary-based module 704 for performing the dictionary-based method 300, an alphabet-based module 706 for performing the alphabet-based method 400, a script-based module 708 for performing the script-based method 500, and a user language profile module 710 for performing the user language profile method 600. Additional language detection methods may be incorporated into the detection method module 16, as desired. Some known methods include using word level n-grams, Markov models, and predictive modeling techniques.

Figure 8:
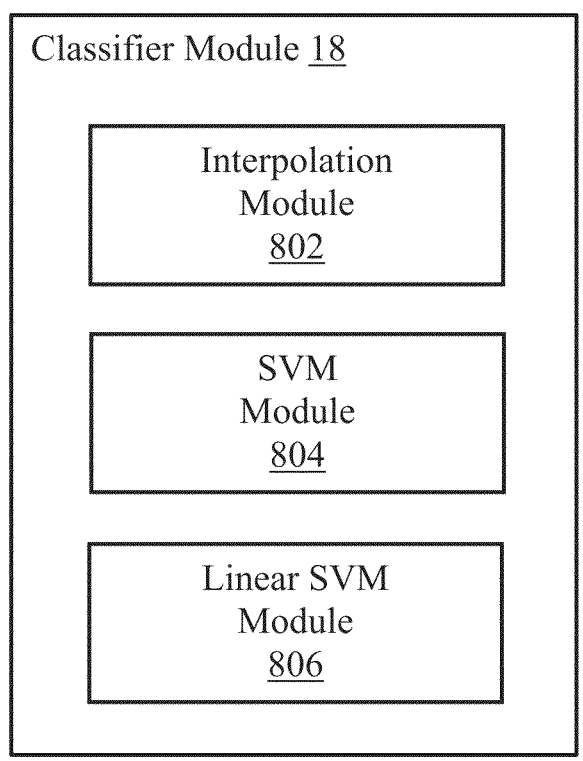
FIG. 8 is a schematic diagram of an example classifier module.

The output from the various language detection methods in the detection method module 16 may be combined using the classifier module 18. Referring to FIG. 8, the classifier module 18 may include an interpolation module 802, a support vector machines (SVM) module 804, and a linear SVM module 806.

The interpolation module 802 is used to perform a linear interpolation of the results from two or more language detection methods. For example, the language of a text message may be determined by interpolating between results from the byte n-gram method and the dictionary-based method. For the chat message "lol gtg," the byte n-gram method may determine the likelihood of English is 0.3, the likelihood of French is 0.4, and the likelihood of Polish is 0.3 (e.g., the output from the byte n-gram method may be {en:0.3, fr:0.4, pl:0.3}). The dictionary-based method may determine the likelihood of English is 0.1, the likelihood of French is 0.2, and the likelihood of Polish is 0.7 (e.g., the output may be {en:0.1, fr:0.2, pl:0.7}). To interpolate between the results of these two methods, the output from the byte n-gram is multiplied by a first weight and the output from the dictionary-based method is multiplied by a second weight, such that the first and second weights add to one. The weighted outputs from the two methods are then added together. For example, if the byte n-gram results are given a weight of 0.6, then the dictionary-based results are given a weight of 0.4, and the interpolation between the two methods is: {en:0.3, fr:0.4, pl:0.3}*0.6+{en: 0.1, fr:0.2, pl:0.7}*0.4={en:0.22, fr:0.32, pl:0.46}.

In general, the optimal weights for interpolating between two or more values may be determined numerically through trial and error. Different weights can be tried to identify the best set of weights for a given set of messages. In some instances, the weights may be a function of the number of words or characters in the message. Alternatively or additionally, the weights may depend on the linguistic domain of the message. For example, the optimal weights for a gaming environment may be different than the optimal weights for a sports environment. For a combination of the byte n-gram method and the dictionary-based method, good results may be obtained using a weight of 0.1 on the byte n-gram method and a weight of 0.9 on the dictionary-based method.

The SVM module 804 may be or include a supervised learning model that analyzes language data and recognizes language patterns. The SVM module 804 may be a multi-class SVM classifier, for example. For an English SVM classifier, the feature vector may be the concatenation of the two distributions above (i.e., {en:0.3, fr:0.4, pl:0.3, en:0.1, fr:0.2, pl:0.7}). The SVM classifier is preferably trained on labeled training data. The trained model acts as a predictor for an input. The features selected in the case of language detection may be, for example, sequences of bytes, words, or phrases. Input training vectors may be mapped into a multi-dimensional space. The SVM algorithm may then use kernels to identify the optimal separating hyplerplane between these dimensions, which will give the algorithm a distinguishing ability to predict languages (in this case). The kernel may be, for example, a linear kernel, a polynomial kernel, or a radial basis function (RBF) kernel. A preferred kernel for the SVM classifier is the RBF kernel. After training the SVM classifier using training data, the classifier may be used to output a best language among all the possible languages.

The training data may be or include, for example, the output vectors from different language detection methods and an indication of the correct language, for a large number of messages having, for example, different message lengths, linguistic domains, and/or languages. The training data may include a large number of messages for which the language in each message is known.

The linear SVM module 806 may be or include a large-scale linear classifier. An SVM classifier with a linear kernel may perform better than other linear classifiers, such as linear regression. The linear SVM module 806 differs from the SVM module 804 at the kernel level. There are some cases when a polynomial model works better than a linear model, and vice versa. The optimal kernel may depend on the linguistic domain of the message data and/or the nature of the data.

Other possible classifiers used by the systems and methods described herein include, for example, decision tree learning, association rule learning, artificial neural networks, inductive logic programming, random forests, clustering, Bayesian networks, reinforcement learning, representation learning, similarity and metric learning, and sparse dictionary learning. One or more of these classifiers, or other classifiers, may be incorporated into and/or form part of the classifier module 18.

Figure 9:
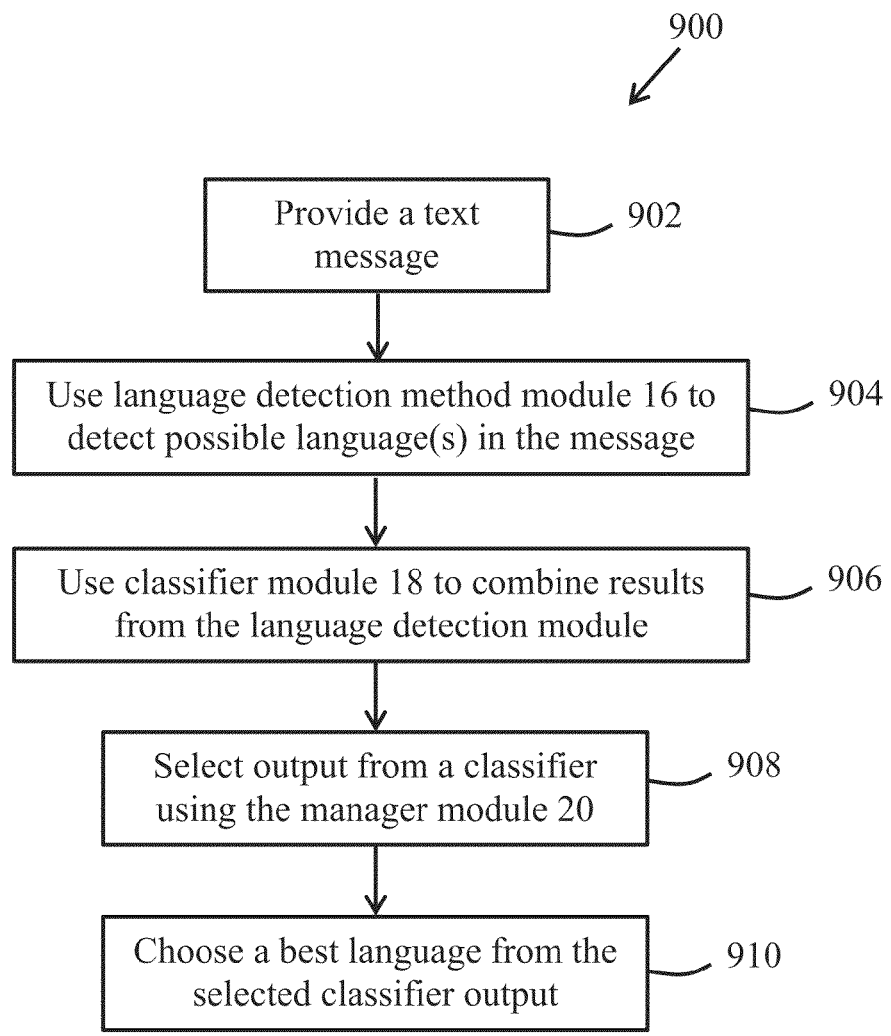
FIG. 9 is a flowchart of an example method of detecting a language in a text message using the language detection method module of FIG. 7 and the classifier module of FIG. 8.

Referring to FIG. 9, an example method 900 uses the detection method module 16, the classifier module 18, and the manager module 20 to detect the language in a message. The message is provided or delivered (step 902) to the detection method module 16. The message may be accompanied by information about the message and/or the user who generated the message. The information may include, for example, an identification number for the user, information about the keyboard used by the user to generate the message, and/or information about the operating system controlling the software used by the user to generate the message. For example, the message may be accompanied by data indicating the user used a French keyboard to generate the message and that user's operating system is in English.

In the detection method module 16, one or more language detection methods are used (step 904) to detect a language in the message. Each method used by the detection method module 16 may output a prediction regarding the language present in the message. The prediction may be in the form of a vector that includes a probability for each possible language that may be in the message.

The output from the detection method module 16 is then delivered to the classifier module 18 where the results from two or more language detection methods may be combined (step 906). Various combinations of the results from the language detection methods may be obtained. In one example, the results from the byte n-gram method and the dictionary based method are combined in the classifier module 18 by interpolation. In another example, a SVM combination or classification is performed on the results from the byte n-gram method, the dictionary-based method, the alphabet method, and the user profile method. Alternatively or additionally, the combination may include or consider results from the script-based method. A further example includes a large linear combination of the byte n-gram method, the language profile method, and the dictionary method. In general, however, the results from any two or more of the language detection methods may be combined in the classifier module 18.

The method 900 uses the manager module 20 to select output (step 908) from a particular classifier. The output may be selected based on, for example, a confidence score computed by a classifier, an expected language detection accuracy, and/or a linguistic domain for the message. A best language is then chosen (step 910) from the selected classifier output.

Figure 10:
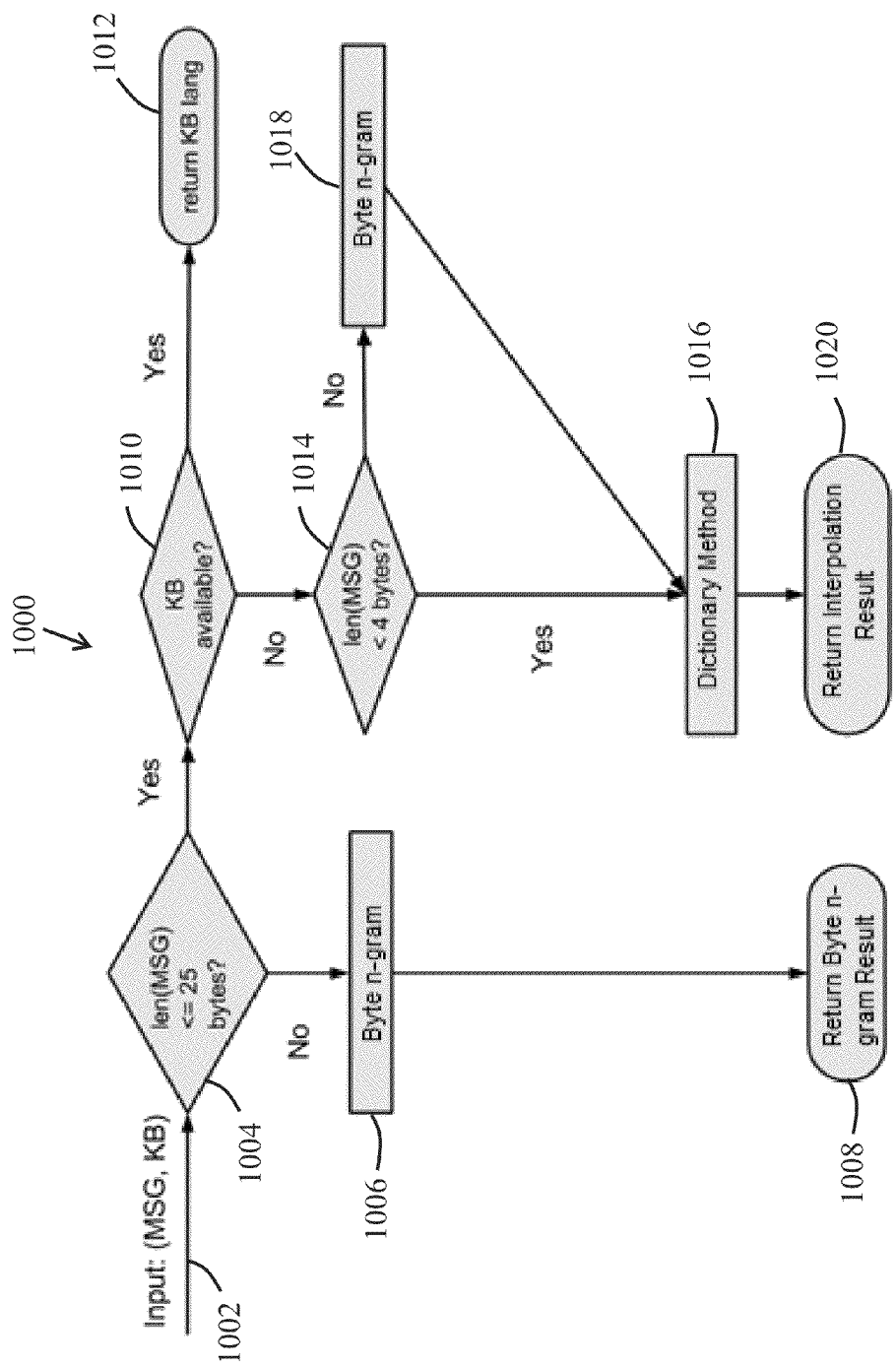
FIG. 10 is a flowchart of an example method of detecting a language in a text message.

In some instances, the systems and methods described herein choose the language detection method(s) according to the length of the message. For example, referring to FIG. 10, a method 1000 includes receiving or providing a message (step 1002) that may include information about the keyboard language used to generate the message. If the message is greater than a threshold length (e.g., 25 bytes or 25 characters) (step 1004), the language may be detected (step 1006) using the byte n-gram method (or other method or combination of methods). The language of the message may then be chosen (step 1008), based on the results from the byte n-gram method. Otherwise, if the message is less than or equal to the threshold length, the system may determine if the keyboard language is available (step 1010). If the keyboard language is available, the language of the message may be chosen (step 1012) to be the same as the keyboard language. Alternatively, if the keyboard language is not available, the method 1000 may again consider the length of the message. For example, if the message length is less than a second threshold (e.g., 4 bytes or 4 characters) (step 1014), the language may be detected (step 1016) and chosen using the dictionary-based method. Otherwise, if the message length is greater than the second threshold, the byte n-gram method (or other method or combination of methods) may be used (step 1018) to detect the language in the message. The results from the byte n-gram method and the dictionary-based method may be combined (e.g., using an interpolator or other classifier), and the language of the message may be determined based on the combination (step 1020).

Figure 11:
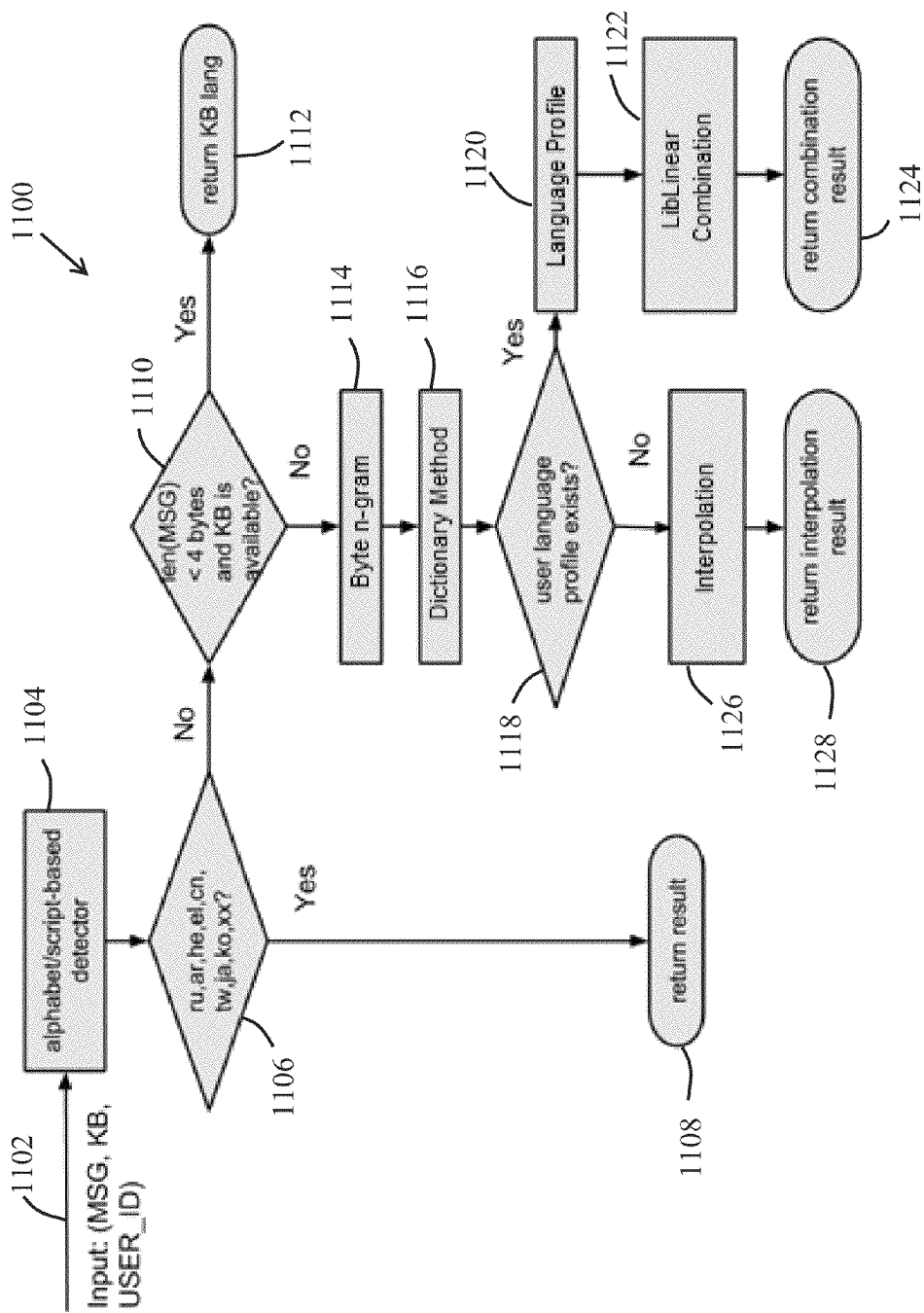
FIG. 11 is a flowchart of an example method of detecting a language in a text message.

FIG. 11 is an example method 1100 of identifying a language in a text message. A text message that was generated on a client device of a user is received or provided (step 1102). The alphabet-based method and/or the script-based method are used to determine (step 1104) an alphabet and/or a script associated with the text message. A candidate language associated with the alphabet and/or the script is identified. If the candidate language is a language with a unique alphabet and/or script (e.g., Russian, Arabic, Hebrew, Greek, Chinese, Taiwanese, Japanese, or Korean) (step 1106), then the candidate language is determined (step 1108) to be the language of the text message.

Otherwise, if the candidate language is not a language with a unique alphabet and/or script, then the length of the text message is evaluated. If the message length is less than a threshold length (e.g., four bytes or four characters) and the text message includes or is accompanied by a keyboard language used by the client device (step 1110), then the language of the message is chosen (step 1112) to be the keyboard language.

Alternatively, if the message length is greater than the threshold length or the keyboard language is not available, then the message is processed with an n-gram method (e.g., the byte n-gram method) to identify (step 1114) a first set of possible languages for the text message. The message is also then processed with the dictionary-based method to identify (step 1116) a second set of possible languages for the text message. If a user language profile exists for the user (step 1118), then the first set of possible languages, the second set of possible languages, and the user language profile 1120 are combined (e.g., using an SVM classifier or a large linear classifier) to obtain a first combination of possible languages (step 1122). The language of the text message is then chosen (step 1124), based on the first combination of possible languages. Otherwise, if the user language profile is not available, then the first set of possible languages and the second set of possible languages are combined (e.g., using a linear interpolator or other classifier) to obtain a second combination of possible languages (step 1126). Finally, the language of the text message is chosen (step 1128), based on the second combination of possible languages.

In some instances, language detection is performed by combining the output from multiple language detection methods in two or more steps. For example, a first step may use the alphabet-script based method to detect special languages that use their own unique alphabets or scripts, such as Chinese (cn), Japanese (ja), Korean (ko), Russian (ru), Hebrew (he), Greek (el), and Arabic (ar). If necessary, the second step may use a combination (e.g., from a classifier) of multiple detection methods (e.g., the byte n-gram method, the user language profile based method, and the dictionary-based method) to detect other languages (e.g., Latin languages) in the message.

In certain examples, the message provided or received for language detection includes certain digits, characters, or images (e.g., emoticons or emojis) that are not specific to any particular language and/or are recognizable to any user, regardless of language preference. The systems and methods described herein may ignore such characters or images when doing language detection and may ignore messages that include only such characters or images.

Figure 12:
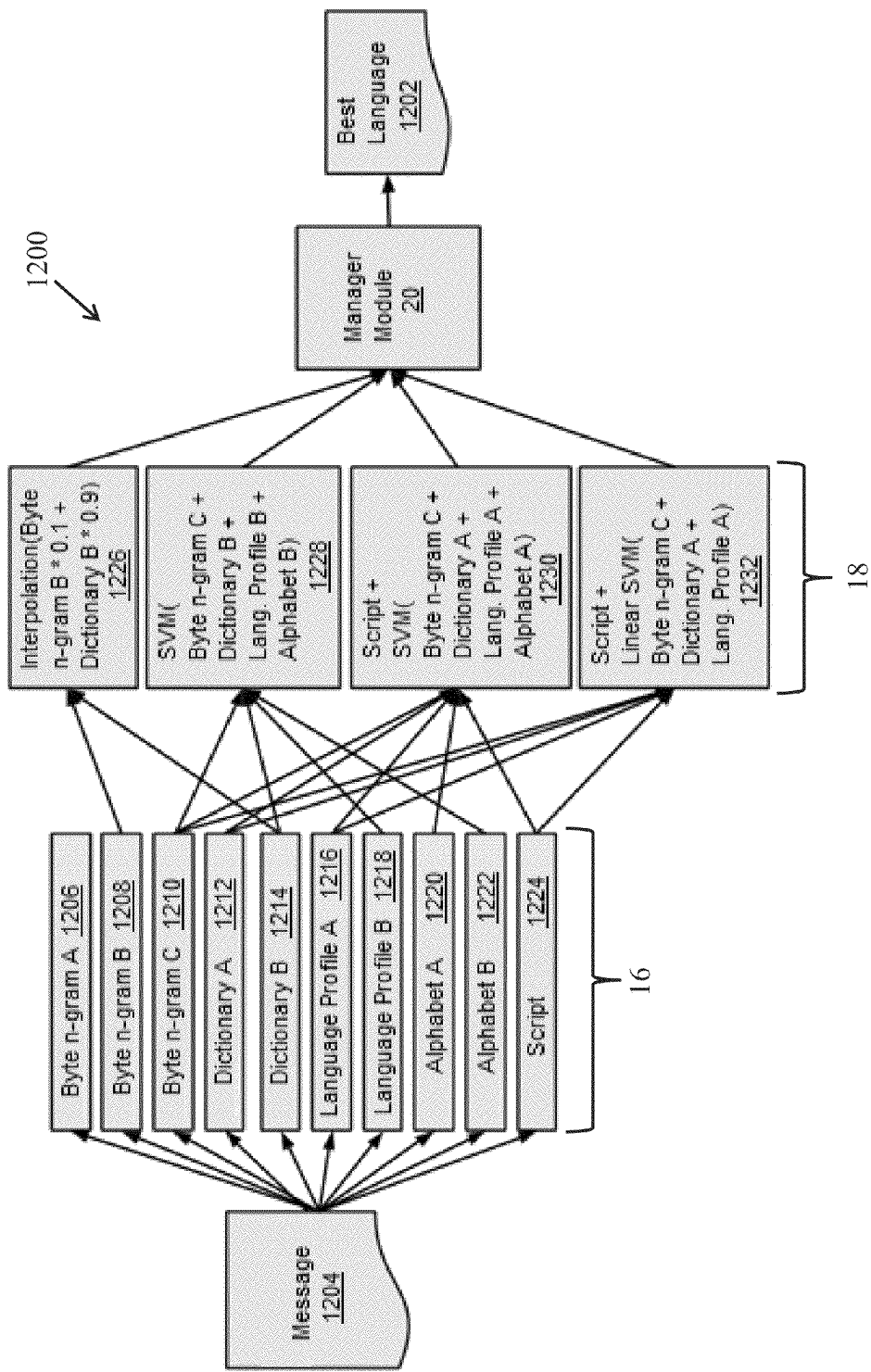
FIG. 12 is a flowchart of an example method of detecting a language in a text message.

FIG. 12 is a flowchart of an example method 1200 for detecting a language in a message. The method uses the detection method module 16, the classifier module 18, and the manager module 20 to identify a most likely or best language 1202 for a given input message 1204. The input message 1204 may be accompanied by information about the user or the system(s) used to generate the message. For example, the input message 1204 may be accompanied by a user identification number (or other user identifier), information about the keyboard (e.g., a keyboard language) used to generate the message, and/or information about the operating system (e.g., an operating system language) used to generate the message.

In the depicted example method 1200, the detection method module 16 includes ten different language detection methods. Three of the language detection methods in the detection method module 16 are Byte n-gram A 1206, Byte n-gram B 1208, and Byte n-gram C 1210, which are all byte n-gram methods and may be configured to detect a different set or number of languages. For example, Byte n-gram A 1206 may be configured to detect 97 languages, Byte n-gram B 1208 may be configured to detect 27 languages, and Byte n-gram C 1210 may be configured to detect 20 languages. Two of the language detection methods in the detection method module 16 are Dictionary A 1212 and Dictionary B 1214, which are both dictionary-based methods and may be configured to detect a different set or number of languages. For example, Dictionary A 1212 may be configured to detect 9 languages, and Dictionary B 1214 may be configured to detect 10 languages. Two of the language detection methods in the detection method module 16 are Language Profile A 1216 and Language Profile B 1218, which are user language profile methods and may be configured to detect a different set or number of languages. For example, Language Profile A 1216 may be configured to detect 20 languages, and Language Profile B 1218 may be configured to detect 27 languages. Two of the language detection methods in the detection method module 16 are Alphabet A 1220 and Alphabet B 1222, which are alphabet-based methods and may be configured to detect a different set or number of languages. For example, Alphabet A 1220 may be configured to detect 20 languages, and Alphabet B 1222 may be configured to detect 27 languages. The detection method module 16 also includes a script-based language detection method 1224.

Output from the different language detection methods in the detection method module 16 is combined and processed by the classifier module 18. For example, an interpolation classifier 1226 combines output from Byte n-gram B 1208 and Dictionary B 1214. Weights for the interpolation may be, for example, 0.1 for Byte n-gram B 1208 and 0.9 for Dictionary B 1214. The classifier module 18 may also use an SVM classifier 1228 that combines output from Byte n-gram C 1210, Dictionary B 1214, Language Profile B 1218, and Alphabet B 1222. The classifier module 18 may also use a first combination 1230 of the script-based method 1224 and an SVM classifier combination of Byte n-gram C 1210, Dictionary A 1212, Language Profile A 1216, and Alphabet A 1220. Additionally, the classifier module 18 may use a second combination 1232 of the script based method 1224 and a Linear SVM classifier combination of Byte n-gram C 1210, Dictionary A 1212, and Language Profile A 1216. While FIG. 12 shows specific language detection tests, classifiers, and combinations of detection test output being used in the classifier module 18, other language detection tests, classifiers, and/or combinations may be used.

For both the first combination 1230 and the second combination 1232, the script-based method 1224 and the classifier may be used in a tiered approach. For example, the script-based method 1224 may be used to quickly identify languages having unique scripts. When such a language is identified in the message 1204, use of the SVM classifier in the first combination 1230 or the Linear SVM classifier in the second combination may not be required.

In general, the manager module 20 may select specific language detection methods, classifiers, and/or combinations of detection method output to identify the language in the message 1204. The manager module 20 may make the selection according to the linguistic domain or according to an anticipated language for the message. The manager module 20 may select specific classifiers according to a confidence score determined by the classifiers. For example, the manager module 20 may select the output from the classifier that is the most confident in its prediction.

In certain implementations, the systems and methods described herein are suitable for making language detection available as a service to a plurality of users. Such a service is made possible and/or enhanced by the speed at which the systems and methods identify languages, and by the ability of the systems and methods to handle multiple identification techniques at runtime, based on service requests from diverse clients.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. For example, parallel processing may be used to perform multiple language detection methods simultaneously. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of identifying a language of a message, the method comprising:
    training a first classifier using training data comprising collections of first score sets from different language detection tests and an indication of the correct language for each collection of score sets wherein each first score set comprises a plurality of respective scores each representing a likelihood that a respective first message is in one of a plurality of different languages;
    performing a plurality of the language detection tests on text in a message authored by a user, each language detection test determining a respective set of scores, each score in the set of scores representing a likelihood that the message is in a respective language of the plurality of different languages;
    providing one or more combinations of the score sets as input to one or more distinct classifiers including the first classifier;
    obtaining as output from each of the one or more classifiers a respective indication that the message is in one of the plurality of different languages, the indication comprising a confidence score; and
    identifying the language of the message based on one of the confidence scores.

2. The method of claim 1, wherein a particular classifier is a supervised learning model, a partially supervised learning model, an unsupervised learning model, or an interpolation.

3. The method of claim 1, wherein identifying the language of the message comprises selecting the confidence score based on an expected language detection accuracy.

4. The method of claim 1, wherein identifying the language of the message comprises selecting the confidence score based on the linguistic domain of the message.

5. The method of claim 1, wherein the message comprises two or more of the following: a letter, a number, a symbol, and an emoticon.

6. The method of claim 1, wherein the plurality of different language detection tests comprises at least two methods selected from the group consisting of a byte n-gram method, a dictionary-based method, an alphabet-based method, and a script-based method.

7. The method of claim 1, wherein the plurality of different language detection tests are performed simultaneously.

8. The method of claim 1, wherein the one or more combinations comprise score sets from a byte n-gram method and a dictionary-based method.

9. The method of claim 8, wherein the one or more combinations further comprise score sets from at least one of a script-based method and an alphabet-based method.

10. The method of claim 1, wherein the score sets comprise at least one score from a user language profile method that identifies a language preference for the user based on previous messages authored by the user.

11. A system for identifying a language of a message, the system comprising:
    a computer storage device having instructions stored thereon; and
    a data processing apparatus configured to execute the instructions to perform operations comprising:
        training a first classifier using training data comprising collections of first score sets from different language detection tests and an indication of the correct language for each collection of score sets wherein each first score set comprises a plurality of respective scores each representing a likelihood that a respective first message is in one of a plurality of different languages;

performing a plurality of the language detection tests on text in a message authored by a user, each language detection test determining a respective set of scores, each score in the set of scores representing a likelihood that the message is in a respective language of the plurality of different languages;

providing one or more combinations of the score sets as input to one or more distinct classifiers including the classifier;

obtaining as output from each of the one or more classifiers a respective indication that the message is in one of the plurality of different languages, the indication comprising a confidence score; and identifying the language of the message based on one of the confidence scores.

12. The system of claim 11, wherein a particular classifier is a supervised learning model, a partially supervised learning model, an unsupervised learning model, or an interpolation.

13. The system of claim 11, wherein identifying the language of the message comprises selecting the confidence score based on an expected language detection accuracy.

14. The system of claim 11, wherein identifying the language of the message comprises selecting the confidence score based on the linguistic domain of the message.

15. The system of claim 11, wherein the message comprises two or more of the following: a letter, a number, a symbol, and an emoticon.

16. The system of claim 11, wherein the plurality of different language detection tests comprises at least two methods selected from the group consisting of a byte n-gram method, a dictionary-based method, an alphabet-based method, and a script-based method.

17. The system of claim 11, wherein the plurality of different language detection tests are performed simultaneously.

18. The system of claim 11, wherein the one or more combinations comprise score sets from a byte n-gram method and a dictionary-based method.

19. The system of claim 18, wherein the one or more combinations further comprise score sets from at least one of a script-based method and an alphabet-based method.

20. The system of claim 11, wherein the score sets comprise at least one score from a user language profile method that identifies a language preference for the user based on previous messages authored by the user.

21. A computer program product stored in one or more storage devices for controlling a processing mode of a data processing apparatus, the computer program product being executable by the data processing apparatus to cause the data processing apparatus to perform operations comprising:

training a first classifier using training data comprising collections of first score sets from different language detection tests and an indication of the correct language for each collection of score sets wherein each first score set comprises a plurality of respective scores each representing a likelihood that a respective first message is in one of a plurality of different languages;

performing a plurality of the language detection tests on text in a message authored by a user, each language detection test determining a respective set of scores, each score in the set of scores representing a likelihood that the message is in a respective language of the plurality of different languages;

providing one or more combinations of the score sets as input to one or more distinct classifiers including the first classifier;

obtaining as output from each of the one or more classifiers a respective indication that the message is in one of the plurality of different languages, the indication comprising a confidence score; and identifying the language of the message based on one of the confidence scores.

22. The computer program product of claim 21, wherein a particular classifier is a supervised learning model, a partially supervised learning model, an unsupervised learning model, or an interpolation.

23. The computer program product of claim 21, wherein identifying the language of the message comprises selecting the confidence score based on an expected language detection accuracy.

24. The computer program product of claim 21, wherein identifying the language of the message comprises selecting the confidence score based on the linguistic domain of the message.

25. The computer program product of claim 21, wherein the message comprises two or more of the following: a letter, a number, a symbol, and an emoticon.

26. The computer program product of claim 21, wherein the plurality of different language detection tests comprises at least two methods selected from the group consisting of a byte n-gram method, a dictionary-based method, an alphabet-based method, and a script-based method.

27. The computer program product of claim 21, wherein the plurality of different language detection tests are performed simultaneously.

28. The computer program product of claim 21, wherein the one or more combinations comprise score sets from a byte n-gram method and a dictionary-based method.

29. The computer program product of claim 28, wherein the one or more combinations further comprise score sets from at least one of a script-based method and an alphabet-based method.

30. The computer program product of claim 21, wherein the score sets comprise at least one score from a user language profile method that identifies a language preference for the user based on previous messages authored by the user.

* * * * *